United States Patent
Lee et al.

(10) Patent No.: US 8,181,552 B2
(45) Date of Patent: May 22, 2012

(54) DRIVING APPARATUS AND ROBOT HAVING THE SAME

(75) Inventors: Youn Baek Lee, Suwon-si (KR); Yong Jae Kim, Seoul (KR); Yeon Taek Oh, Yongin-si (KR); Soo Sang Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 476 days.

(21) Appl. No.: 12/427,016

(22) Filed: Apr. 21, 2009

(65) Prior Publication Data

US 2009/0320638 A1   Dec. 31, 2009

(30) Foreign Application Priority Data

Jun. 30, 2008   (KR) .................. 10-2008-0063006

(51) Int. Cl.
*B25J 17/00* (2006.01)
(52) U.S. Cl. .................................... 74/490.04
(58) Field of Classification Search ............. 74/89.17, 74/490.03, 490.04, 490.09, 422; 475/286, 475/295; 901/16, 21–25; 414/744, 4, 744.5
See application file for complete search history.

(56) References Cited

U.S. PATENT DOCUMENTS

| | | | | |
|---|---|---|---|---|
| 4,192,092 A | * | 3/1980 | Goldfarb et al. | 446/304 |
| 5,012,985 A | * | 5/1991 | Pepe | 242/474.5 |
| 5,784,932 A | * | 7/1998 | Gilberti | 74/813 R |
| 5,816,770 A | * | 10/1998 | Itagaki | 414/744.5 |
| 6,151,981 A | * | 11/2000 | Costa | 74/490.03 |

FOREIGN PATENT DOCUMENTS

| | | |
|---|---|---|
| JP | 11-156770 | 6/1999 |
| JP | 2002-205877 | 7/2002 |

OTHER PUBLICATIONS

Korean Office Action issued Jun. 1, 2010 in KR Application No. 2008-0063006.

* cited by examiner

*Primary Examiner* — Robert Pezzuto
(74) *Attorney, Agent, or Firm* — Stanzione & Kim, LLP

(57) ABSTRACT

A driving apparatus includes a driving unit, a driven unit separated from the driving unit at a separation space so as not to contact the driving unit, and rotated by rotary force generated from the driving unit, a cable connecting the driving unit and the driven unit, and to transmit the rotary force to the driven unit, and pressure units provided in the separation space, and to pressurize the cable in a direction of approaching opposite portions of the cable to each other to generate a tensile strength of the cable. Since the cable transmitting the rotary force of the driving unit to the driven unit has sufficient tensile strength, preventing the generation of slip of the cable from the driving unit and the driven unit is possible, and thus to allow the rotary force to be transmitted to the driven unit without a loss.

18 Claims, 8 Drawing Sheets

DRIVING APPARATUS AND ROBOT HAVING THE SAME

CROSS-REFERENCE TO RELATED APPLICATIONS

This application claims priority under 35 U.S.C. §119(a) from Korean Patent Application No. 2008-0063006, filed Jun. 30, 2008, in the Korean Intellectual Property Office, the disclosure of which is incorporated herein in its entirety by reference.

BACKGROUND

1. Field

The present general inventive concept relates to a driving apparatus and a robot having the same, and more particularly to a driving apparatus, in which pressure units provide tensile strength to prevent a generation of slip of a cable from a driving unit and a driven unit, and a robot having the driving apparatus.

2. Description of the Related Art

In general, driving apparatuses refer to apparatuses, which drive a power tool, such as an instrument or a measuring machine. The driving apparatuses transmit rotary force generated by an internal combustion engine or a motor to the power tool such that the power tool performs an intended motion.

Among the driving apparatuses, there is a driving apparatus, which transmits rotary force using a capstan method. The capstan-type driving apparatus transmits power including a rotary force using a cable. That is, the capstan type driving apparatus transmits the rotary force from a driving unit to a driven unit by winding the cable on a plurality of shafts or unwinding the cable from the shafts.

As a technique relating to robots has been developed now, an attempt to develop humanoid robots, which have the similar appearance to that of a human being, rather than industrial robots, which conventionally performed a specific motion, have been made.

In order to manufacture a humanoid robot, effectively transmitting rotary force for operating arms, legs, etc., in a minimum space is necessary, and in order to satisfy the above requirement, the capstan method has been introduced.

In a capstan-type driving apparatus using a cable, when the cable is loosened, slip of the cable from shafts, on which the cable is wound, is generated, and thus disturbs a smooth transmission of a rotary force. Thus, a designated intensity or more of tensile strength must be applied to the cable.

However, the conventional driving apparatus prevents the generation of slip of the cable from the shafts by increasing a number of winding times of the cable on the shafts and causes the shafts to have a long length, thus having an increased overall size.

SUMMARY

The present general inventive concept provides a driving apparatus and a robot having the same, in which a cable transmitting the rotary force of a driving unit to a driven unit has sufficient tensile strength and thus prevents a generation of slip of the cable from the driving unit and the driven unit to allow the rotary force to be transmitted to the driven unit without a loss.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a driving apparatus including a driving unit, a driven unit separated from the driving unit at a separation space so as not to contact the driving unit, and rotated by rotary force generated from the driving unit, a cable connecting the driving unit and the driven unit, and to transmit the rotary force to the driven unit, and pressure units provided in the separation space, and to pressurize the cable in a direction of approaching opposite portions of the cable to each other to generate a tensile strength of the cable.

The pressure units may be provided to pressurize the cable inwardly from outside of a loop formed by the cable.

A groove-shaped guide corresponding to a diameter of the cable to guide a winding position of the cable may be provided on an outer circumferential surface of at least one of the driving unit, the driven unit, and the pressure units.

The guide provided on the driven unit may include a parallel portion provided on the outer circumferential surface of the driven unit in a direction perpendicular to an axial direction of the driven unit, and a shift portion moving the winding position of the cable in parallel in the axial direction of the driven unit.

The driven unit may have a cylindrical drum shape, and may include a level portion having a level outer circumferential surface, and the shift portion may be provided on the level portion.

The shift portion may include inclined portions inclined at a designated angle against the guide provided on the parallel portion, and the inclined portions may move the cable in parallel by as long as at least the diameter of the cable.

The pressure units may be prepared in a pair, and each of the guides respectively provided on the pressure units may include a shift portion moving the winding position of the cable in parallel in the axial direction of the pressure units by as long as half of the diameter of the cable.

Each of the pressure units may have a cylindrical roller shape.

The foregoing and/or other aspects and utilities of the general inventive concept may also be achieved by providing a robot having at least one driving apparatus, the driving apparatus including a driving unit to generate a rotary force, a driven unit separated from the driving unit at a separation space so as not to contact the driving unit, and rotated by rotary force generated from the driving unit, a cable to transmit the rotary force to the driven unit, and a pair of pressure units provided in the separation space, and to pressurize the cable inwardly from outside of a loop formed by the cable to increase contact between the cable and at least one of the driving unit and the driven unit.

A groove-shaped guide corresponding to the diameter of the cable to guide the winding position of the cable may be provided on the outer circumferential surface of at least one of the driving unit, the driven unit, and the pressure units.

The guide provided on the driven unit may include a parallel portion provided on the outer circumferential surface of the driven unit in a direction perpendicular to the axial direction of the driven unit, and a shift portion moving the winding position of the cable in parallel in the axial direction of the driven unit.

The foregoing and/or other aspects and utilities of the general inventive concept may also be achieved by providing a robot having at least one driving apparatus, the driving apparatus including a driving unit to generate a rotary force, a driven unit separated from the driving unit at a separation space so as not to contact the driving unit, and rotated by rotary force generated from the driving unit, a cable to transmit the rotary force to the driven unit, a pair of pressure units provided in the separation space, and to pressurize the cable inwardly from outside of a loop formed by the cable to increase contact between the cable and at least one of the driving unit and the driven unit, and a groove-shaped shift portion provided on an outer circumferential surface of the driven unit to move the winding position of the cable in parallel in an axial direction of the driven unit.

The foregoing and/or other aspects and utilities of the general inventive concept may also be achieved by providing a robot having at least one driving apparatus, the driving apparatus including a driving unit to generate a rotary force, a driven unit separated from the driving unit at a separation space so as not to contact the driving unit, and rotated by the rotary force generated from the driving unit, a cable to transmit the rotary force to the driven unit, a pair of pressure units provided in the separation space, and to pressurize the cable inwardly from outside of a loop formed by the cable to increase contact between the cable and at least one of the driving unit and the driven unit, and groove-shaped shift portions respectively provided on outer circumferential surfaces of the pressure units to move a winding position of the cable in parallel in an axial direction of the pressure units.

The foregoing and/or other aspects and utilities of the general inventive concept may also be achieved by providing a driving apparatus usable with a robot, the driving apparatus including a driven unit to drive the robot, a driving unit to generate a force, a cable to transmit the force from the driving unit to the driven unit, and one or more pressure units to pressurize the cable by increasing contact between the cable and at least one of the driving unit and the driven unit.

The driving apparatus may further include a groove-shaped shift portion provided on an outer circumferential surface of the driven unit to move to receive the cable.

BRIEF DESCRIPTION OF THE DRAWINGS

These and/or other aspects and utilities of the present general inventive concept will become apparent and more readily appreciated from the following description of the embodiments, taken in conjunction with the accompanying drawings in which.

DETAILED DESCRIPTION

Figure 1:
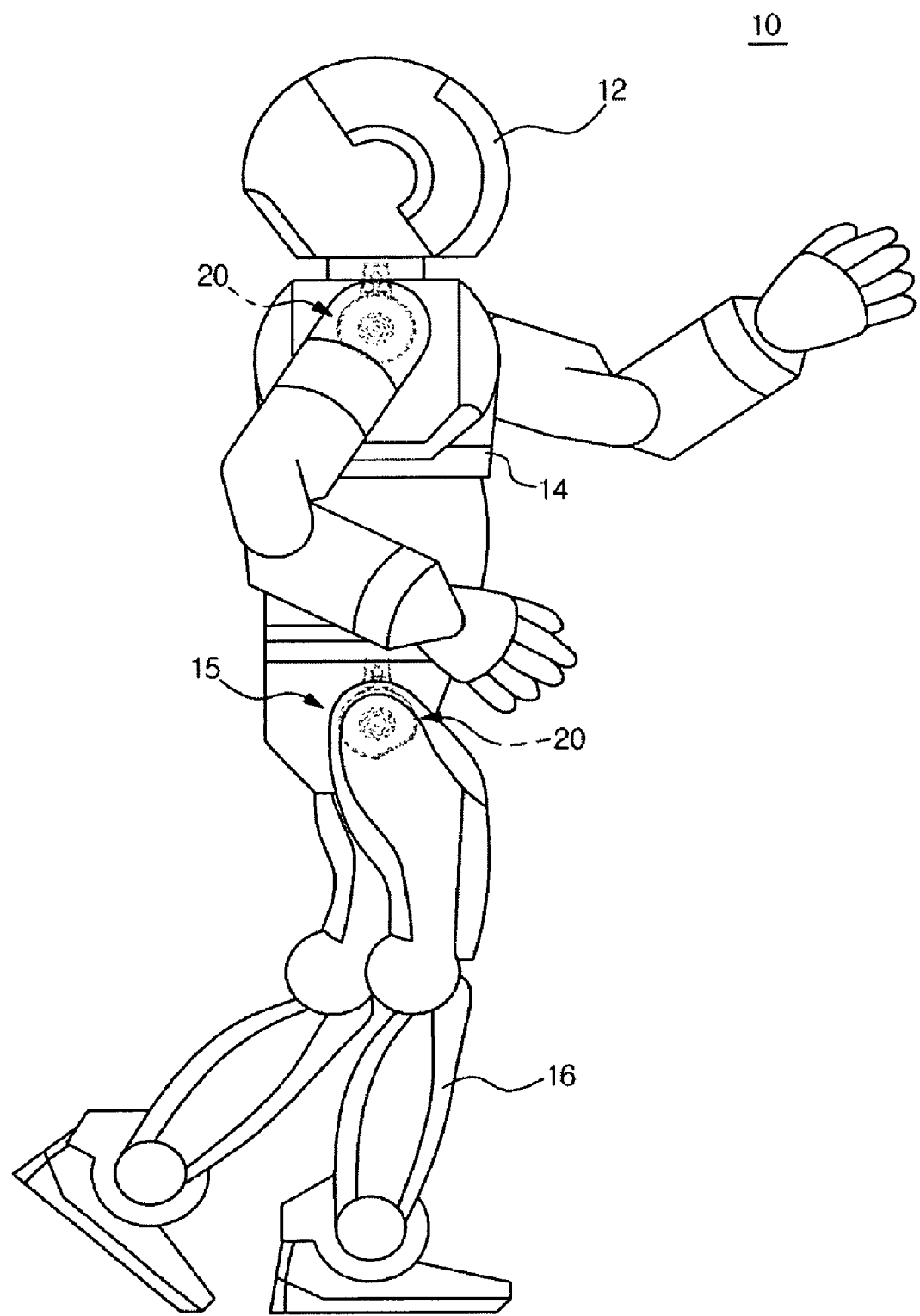
FIG. 1 is a side view of a robot, to which a driving apparatus in accordance with an embodiment of the present general inventive concept is applied.

Reference will now be made in detail to embodiments of the present general inventive concept, an example of which is illustrated in the accompanying drawings, wherein like reference numerals refer to like elements throughout. The embodiments are described below to explain the present general inventive concept by referring to the annexed drawings.

FIG. 1 is a side view of a robot, to which a driving apparatus in accordance with an embodiment of the present general inventive concept is applied.

As illustrated in FIG. 1, a robot 10 in accordance with the present embodiment includes a head 12, a torso 14, and legs 16, and a driving apparatus 20 is provided at each portions, in which a motion is performed.

Figure 2:
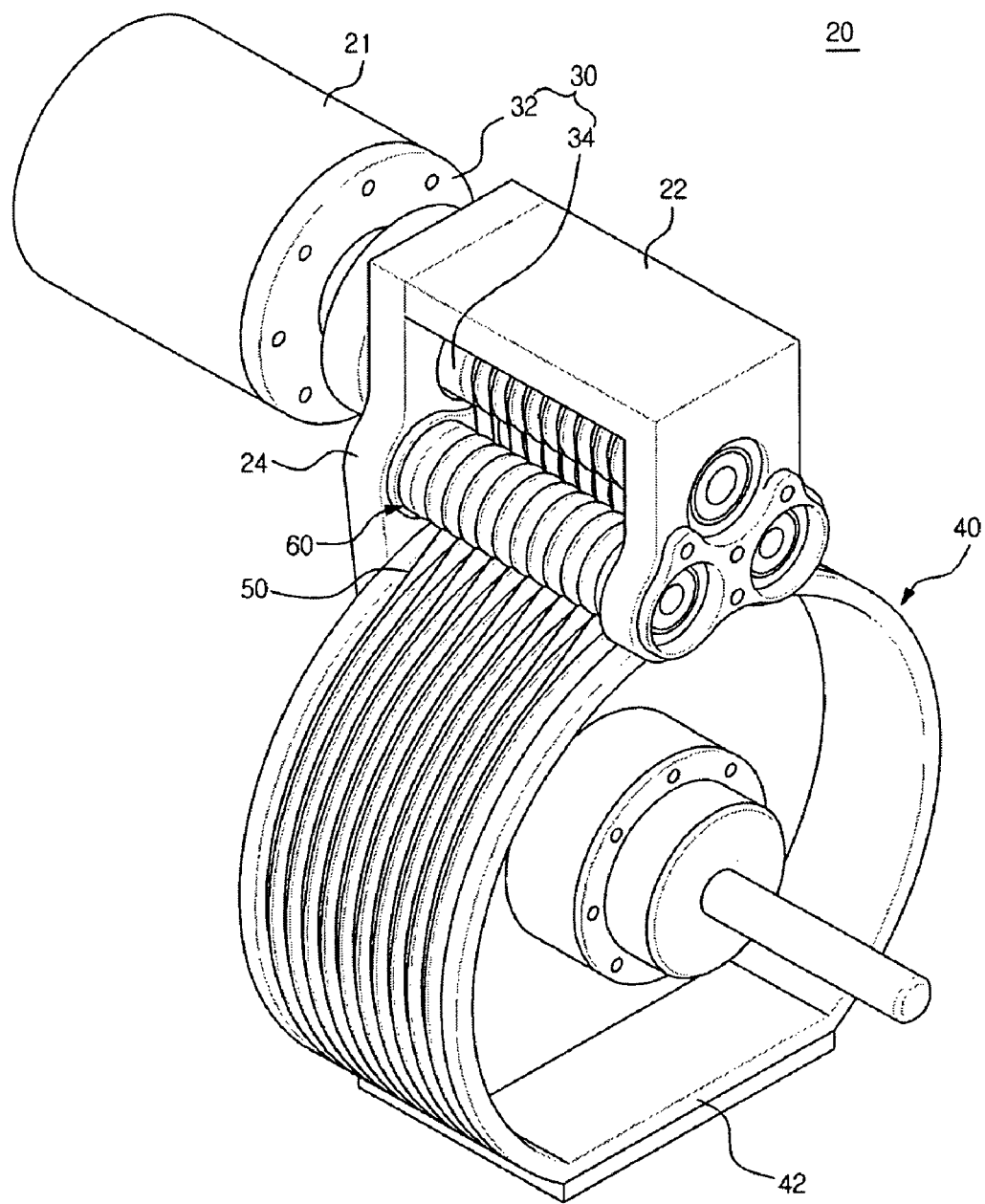
FIG. 2 is a perspective view of the driving apparatus of FIG. 1.

The driving apparatus 20 generates and transmits force, which causes the robot 10 to perform a motion. The driving apparatus 20 may be used at any portion of the robot 10, in which a motion is performed. However, for convenience of description, the driving apparatus 20, which is provided at a connection portion between the torso 14 and the leg 16, i.e., a hip joint 15, will be described unless a special portion is referred to. When a control unit (not illustrated) applies a control signal to move the robot 10 forward or backward to a motor 21 (FIG. 2), the motor 21 (FIG. 2) is operated according to an intensity and duration time of the control signal. Rotary force generated by the operation of the motor 21 (FIG. 2) passes through a transmission process, and is finally transmitted to a driven unit 40 (FIG. 2). Generally, the motor 21 (FIG. 2) is provided on the torso 14, and the driven unit 40 (FIG. 2) is provided on the leg 16. Thus, the hip joint 15 is rotated in clockwise and counterclockwise directions by the rotation of the motor 21 (FIG. 2) in regular and reverse directions, and the leg 16 moves forward and backward, thereby allowing the robot 10 to move forward and backward. There are various methods to transmit the rotary force generated from the motor 21 (FIG. 2). One method out of the methods uses a gear box (not illustrated). In case that the gear box (not illustrated) is used, the rotary force passes through combination of various gear ratios during a transmission process, and thus power transmission efficiency is lowered. Further, in case that the gear box (not illustrated) is made of a metal in order to maintain a strength of the gear box, the gear box has increased weight and size. In order to solve the above problems, the present embodiment discloses the driving apparatus 20 having a high power transmission efficiency, a light weight, and a small size. Hereinafter, the concrete constitution of the driving apparatus 20 will be described, with reference to FIGS. 2 and 3.

Figure 3:
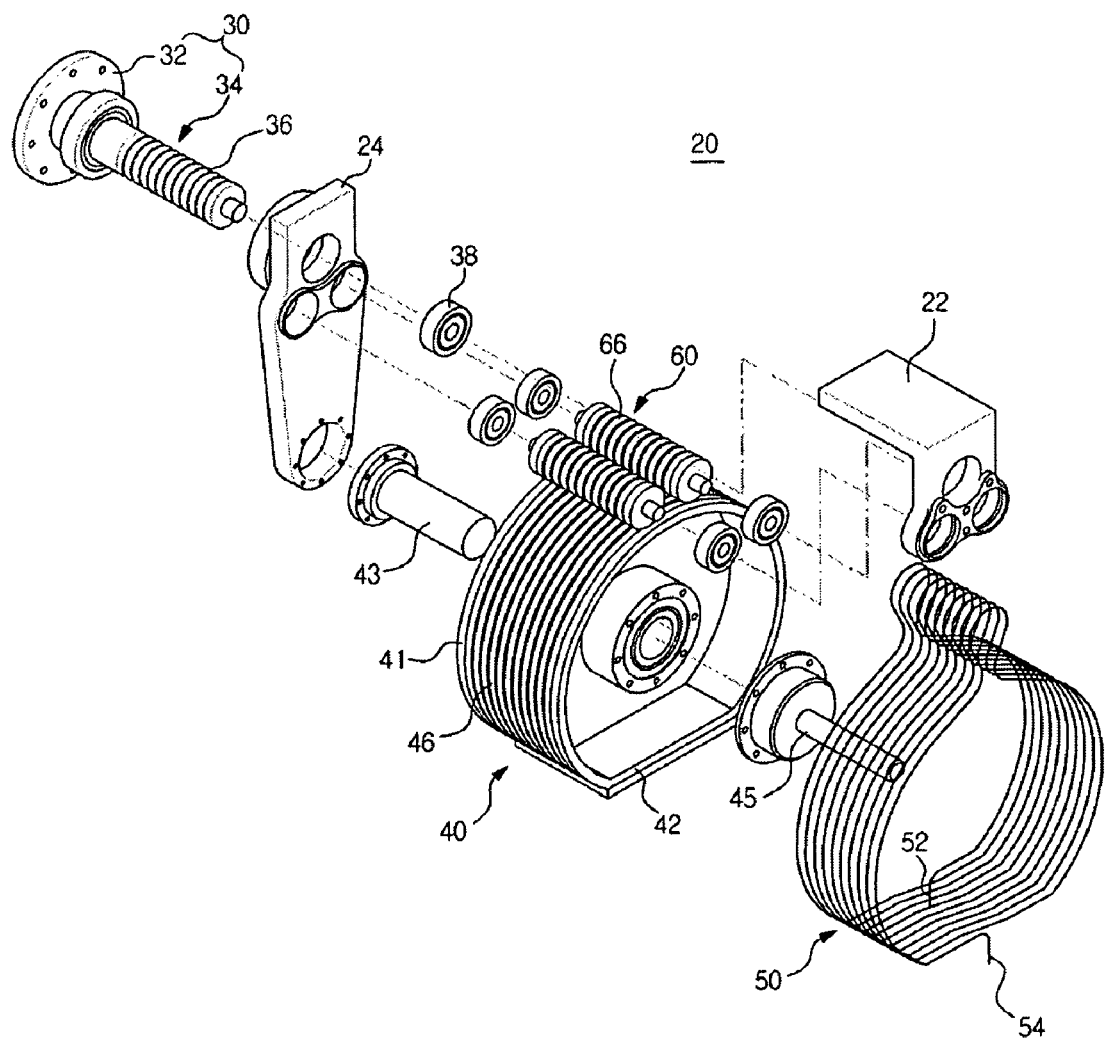
FIG. 3 is an exploded perspective view of the driving apparatus of FIG. 2.
Figure 4:
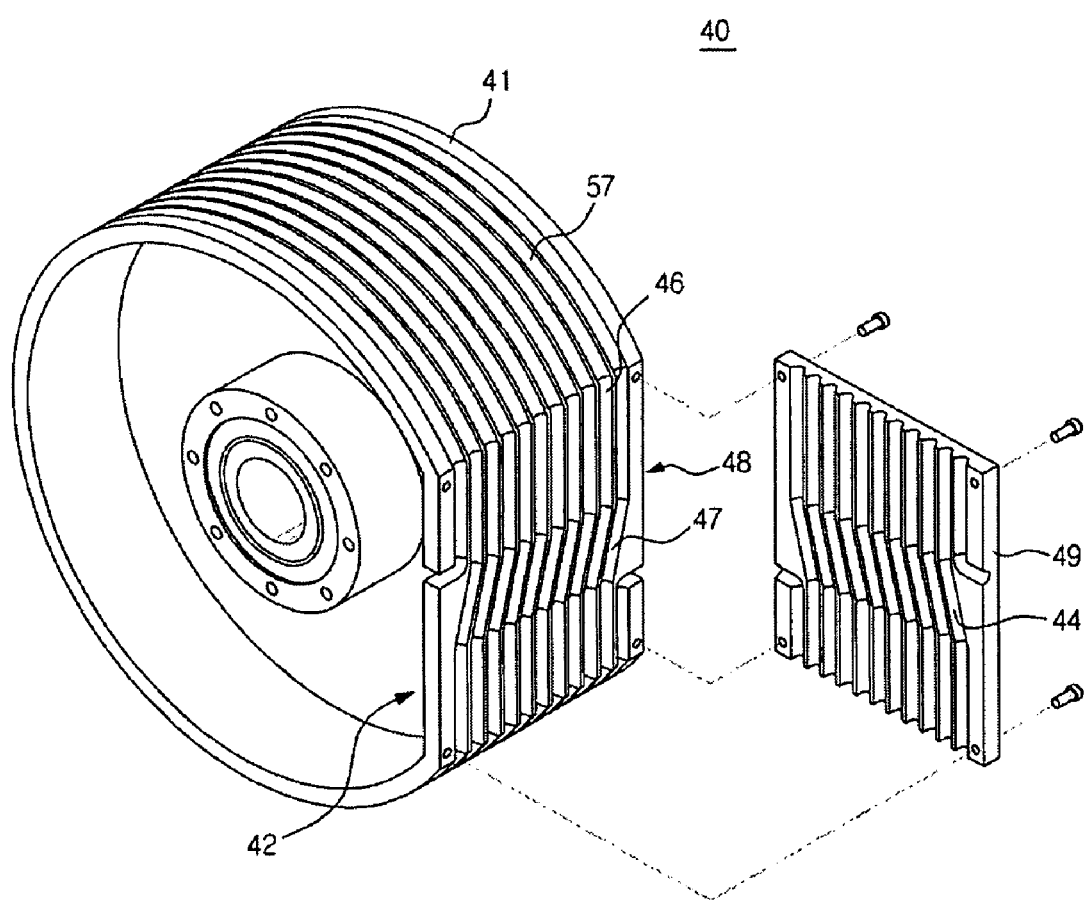
FIG. 4 is an exploded perspective view of a lower surface of the driving apparatus of FIG. 2.

FIG. 2 is a perspective view of the driving apparatus of FIG. 1, FIG. 3 is an exploded perspective view of the driving apparatus of FIG. 2, and FIG. 4 is an exploded perspective view of a lower surface of the driving apparatus of FIG. 2.

As illustrated in FIGS. 2 to 4, the driving apparatus 20 in accordance with the present embodiment includes a driving unit 30, a driven unit 40, a cable 50, and pressure units 60.

The driving unit 30 is connected to a motor shaft (not illustrated), and is rotated by the rotary force generated from the motor 21. That is, the driving unit 30 generates force to operate the driving apparatus 20. The driving unit 30 includes a motor connection portion 32 connected to the motor 21 provided on the torso 14 (FIG. 1), and a driving shaft 34.

The driving shaft 34 is extended from the motor connection portion 32, and serves to substantially transmit rotary force. A length of the driving shaft 34 depends on a number of winding times of the cable 50 on the driving shaft 34. That is, when the number of winding times of the cable 50 on the driving shaft 34 is increased, the length of the driving shaft 34 is relatively increased, and when the number of winding times of the cable 50 on the driving shaft 34 is decreased, the length of the driving shaft 34 is relatively decreased. Further, when the number of winding times of the cable 50 on the driving shaft 34 is increased, although tensile strength applied to the cable 50 is relatively low, the generation of slip is reduced due to increased frictional force. However, when the number of winding times of the cable 50 on the driving shaft 34 is increased, the length of the driving shaft 34 is relatively increased, and thus an overall size of the driving apparatus 20 is increased. In the present embodiment, since the pressure units 60 pressurize the cable 50 and thus tensile strength is generated on the cable 50, the number of winding times of the cable 50 on the driving unit 30 and the driven unit 40 is decreased. Thereby, the overall size of the driving apparatus 20 is reduced. A driving shaft bearing 38 is connected to a portion of the driving shaft 34 at a side of the motor connection portion 32 so that a rotation of the driving shaft 34 can be smoothly performed, and a tip of the driving shaft 34 is supported by a first bracket 22. A first guide 36 is provided on the driving shaft 34.

The first guide 36 guides a position of the cable 50. The first guide 36 is a groove provided on a surface of the driving shaft 34 along a circumference of the driving shaft 34. The cable 50 contacts the driving shaft 34 along the groove-shaped first guide 36. Since the cable 50 is guided by the first guide 36, the cable 50 is not entangled or is not separated from the driving shaft 34 although the driving shaft 34 continuously rotates.

The driven unit 40 receives the rotary force of the driving unit 30. The rotary force generated from the motor 21 rotates the driving unit 30, and the rotary force of the driving unit 30 is transmitted to the driven unit 40 by the cable 50. If the motor 21 is provided on the torso 14 (FIG. 1), the driven unit 40 can be provided on the leg 16 (FIG. 1). Thus, when the driving unit 30 is rotated, the leg 16 (FIG. 1) having the driven unit 40 moves forward and backward. The driven unit 40 may continuously rotate at an angle of 360° or more in one direction or different directions. However, since the driving apparatus 20 in accordance with the embodiment illustrated in FIG. 1 includes a level portion 42 formed at a lower end thereof, the driven unit 40, which does not continuously rotate in one direction or different directions, will be described now. The driven unit 40 includes a driven drum 41 forming the body of the driven unit 40, a driven shaft 43 connected to a second bracket 24 and causing the driven unit 40 to be rotatably connected thereto, and a driven axis 45 connected to the driven drum 41. Although it is described that driving unit 30 is provided on the torso 14 (FIG. 1) and the driven unit 40 is provided on the leg 16 (FIG. 1), the portion of the driven unit 40 except for the driven axis 45 may be provided on the torso 14 (FIG. 1) and only the driven axis 45 may be protruded from the torso 14 (FIG. 1) to the leg 16 (FIG. 1), according to circumstances. In the same manner as the first guide 36 provided on the driving shaft 34, a second guide 46 is provided on an outer surface of the driven drum 41 and guide the position of the cable 50 wound on the outer surface of the driven drum 41. A shift portion 48 is provided on the second guide 46.

The shift portion 48 is provided on the level portion 42 of the driven drum 41. One strand of the cable 50 repeatedly reciprocates between an outer surface of the driving shaft 34 of the driving unit 30 and the outer surface of the driven drum 41 of the driven unit 40, and is thus wound on the driving shaft 34 and the driven drum 41. That is, one strand of the cable 50 reciprocates between the driving unit 30 and the driven unit 40, and forms one closed loop. Since one stand of the cable 50 reciprocates between the driving shaft 34 and the driven drum 41 and is wound on the driving shaft 34 and the driven drum 41, the strand of the cable 50 must be wound at an interval of at least a width of the cable 50 so as not to be entangled. Inclined portions 47 are provided on the second guide 46 at the shift portion 48. The inclined portions 47 are inclined by as much as at least the width of the cable 50. The strand of the cable 50 wound along the second guide 46 is inclined at the inclined portions 47 of the shift portion 48. Thus, the strand of the cable 50 can be wound in parallel without entanglement. A cover 49 is provided on the shift portion 48.

The cover 49 is connected to the shift portion 48. Grooves 44 corresponding to a shape of the shift portion 48 having the inclined portions 47 are provided on the inner surface of the cover 49.

One strand of the cable 50 reciprocates between the driving unit 30 and the driven unit 40, and is wound on the driving unit 30 and the driven unit 40. Although the embodiment illustrated in FIG. 1 illustrates the cable 50 including one strand of a wire, the cable 50 may include strands of a wire according to requirement, such as intensity. The driving apparatus 20 in accordance with the embodiment illustrated in FIG. 1 transmits rotary force by a capstan method. In the capstan method, rotary force is transmitted such that relative positions of the cable 50 and the driven unit 40, on which on the cable 50 is wound, are rarely changed. That is, a general belt-type driving apparatus transmits rotary force from a driving shaft to a driven shaft by rotating a belt provided between the driving shaft and the driven shaft, but the capstan-type driving apparatus 20 corresponds to the cable 50 not rotating as much as a rotation of the belt of the general belt-type driving apparatus. The cable 50 is wound such that a starting point 52 and an ending point 54 of the cable 50 are located in the shift portion 48 of the level portion 42 of the driven drum 41. The cable 50 may be made of any materials, which are not easily tensed, such as metal, plastic, rubber, etc.

The pressure units 60 pressurize the cable 50 so that the cable 50 has tensile strength. The pressure units 60 are provided at both sides of the driving unit 30, and thus are prepared in a pair. Although the embodiment illustrated in FIG. 1 illustrates the pressure units 60 prepared in a pair, the number of the pressure units 60 is not limited thereto. The pressure units 60 in a pair pressurize the cable 50 inwardly. A third guide 66 is provided on a surface of each of the pressure units 60. In the same manner as the first and second guides 36 and 46, the third guides 66 guide the position of the cable 50. However, the third guides 66 contacts the cable 50 at inner portions thereof, but do not cause the cable 50 to be wound on the pressure units 60. Hereinafter, with reference to FIG. 5, the pressure units 60 will be described in detail.

Figure 5:
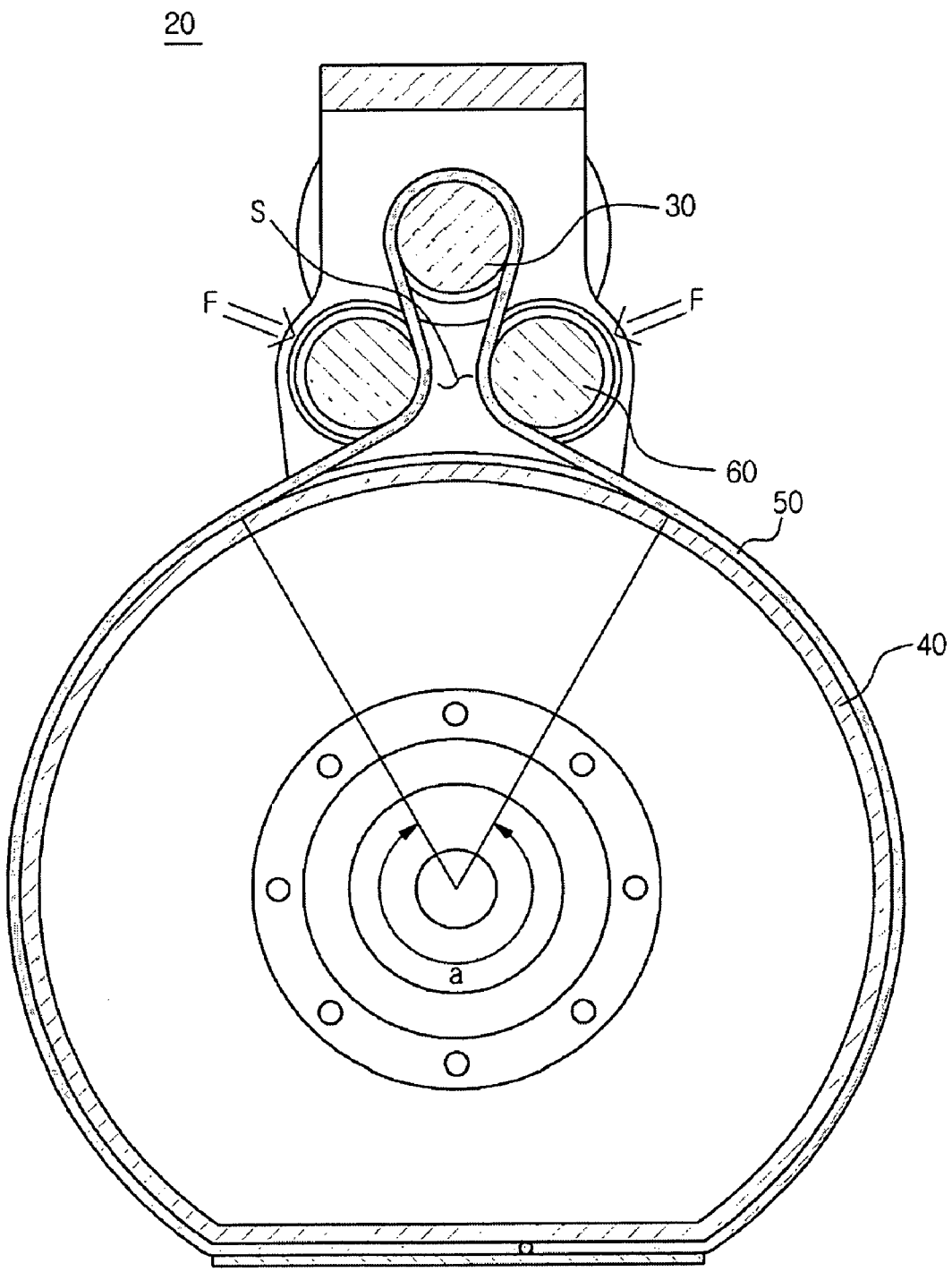
FIG. 5 is a side view of the driving apparatus of FIG. 2.

FIG. 5 is a side view of the driving apparatus of FIG. 2.

As illustrated in FIG. 5, the pressure units 60 of the driving apparatus 20 are provided in a separation space (S), and pressurize the cable 50 in a pressurization direction (F). The separation space (S) is a space between the driving unit 30 and the driven unit 40, which are separated from each other. In the separation space (S), the cable 50 does not contact the driving unit 30 and the driven unit 40. When the pressure units 60 pressurize the cable 50 in the pressurization direction (F) in the separation space (S), the tensile strength of the cable 50 is firstly increased, and contact lengths between the cable 50 and the driving unit 30 and between the cable 50 and the driven unit 40 are secondarily increased.

The tensile strength of the cable 50 is increased by pressurizing the cable 50 in the pressurization direction (F) using the pressure units 60. That is, the tensile strength of the cable 50 is increased when the pressure units 60 pressurize the cable 50, which is wound between the driving unit 30 and the driven unit 40 to form a closed loop, in a direction to reduce a diameter of the closed loop of the cable 50 in the separation space (S). When the tensile strength of the cable 50 is increased, contact force between the cable 50 and the driving unit 30 and between the cable 50 and the driven unit 40 is increased. When the contact force is increased, a possibility of slip of the cable 50 from the surfaces of the driving unit 30 and the driven unit 40 is reduced. Although the driving unit 30 rotates, when the cable 50 is slipped from the surfaces of the driving unit 30 and the driven unit 40, the rotary force of the driving unit 30 cannot be transmitted. Thus, the maintenance of the tensile strength of the cable 50 to prevent the slip of the cable 50 is an important design factor to increase the power transmission efficiency of the driving apparatus 20. The pressure units 60 in accordance with the embodiment illustrated in FIG. 1 employ a relatively simple constitution to pressurize the cable 50 in the pressurization direction (F) in the separation space (S), thus being capable of increasing the tensile strength applied to the cable 50.

The contact lengths between the cable 50 and the driving unit 30 and between the cable 50 and the driven unit 40 are increased by pressurizing the cable 50 in the pressurization direction (F) using the pressure units 60. Accordingly, a contact angle (a) is increased, seen from the side surface of the driven unit 40. In case that the pressure units 60 are not provided, a space formed by the driving unit 30, the driven unit 40, and the cable 50 in the separation space (S) is relatively increased. In case that the pressure units 60 pressurize the cable 50 in the pressurization direction (F), the contact lengths between the cable 50 and the driving unit 30 and between the cable 50 and the driven unit 40 are increased and thus the contact angle (a) is increased. When the contact lengths and the contact angle (a) are increased by the pressure units 60, frictional force between the cable 50 and the driving unit 30 and between the cable 50 and the driven unit 40 is increased. When the frictional force is increased, the generation of the slip of the cable 50 is reduced and thus the power transmission efficiency of the driving apparatus 20 is increased.

Hereinafter, the operation of the above driving apparatus 20 in accordance with the embodiment as illustrated in FIG. 1 will be described, with reference to FIGS. 6 and 7.

Figure 6:
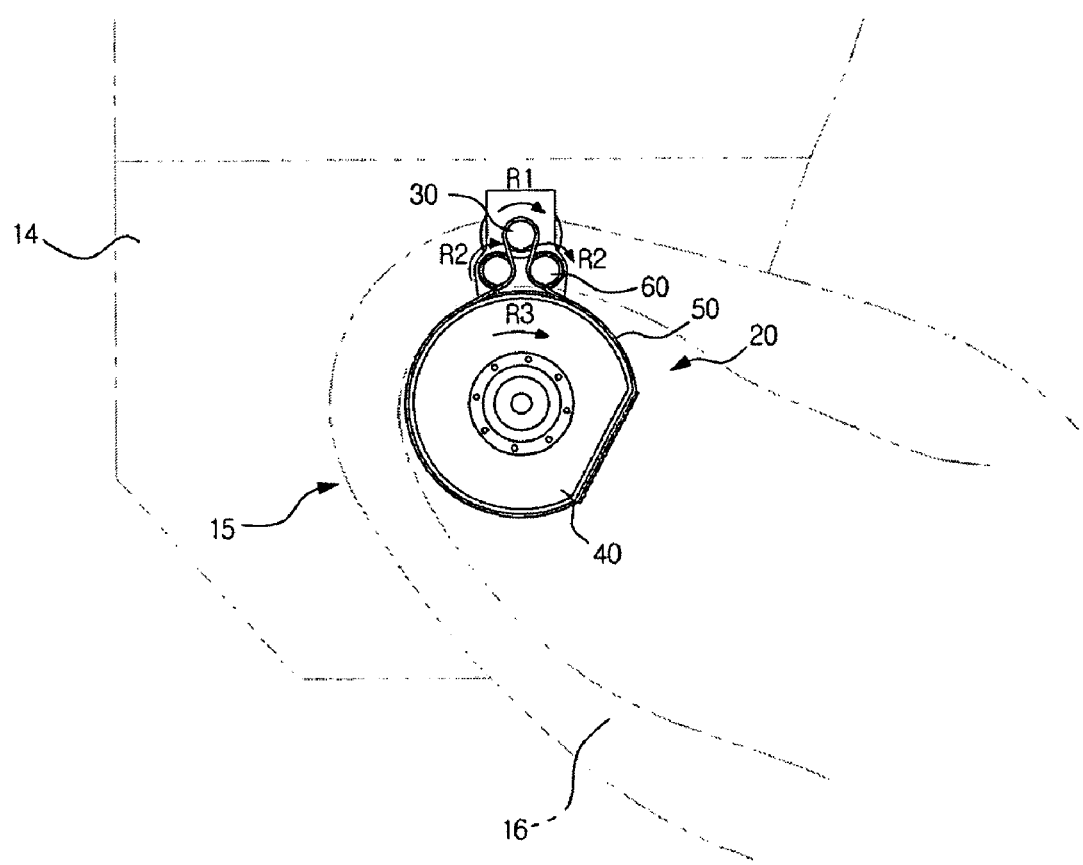
FIGS. 6 and 7 are views illustrating an operation of the driving apparatus of FIG. 1.
Figure 7:
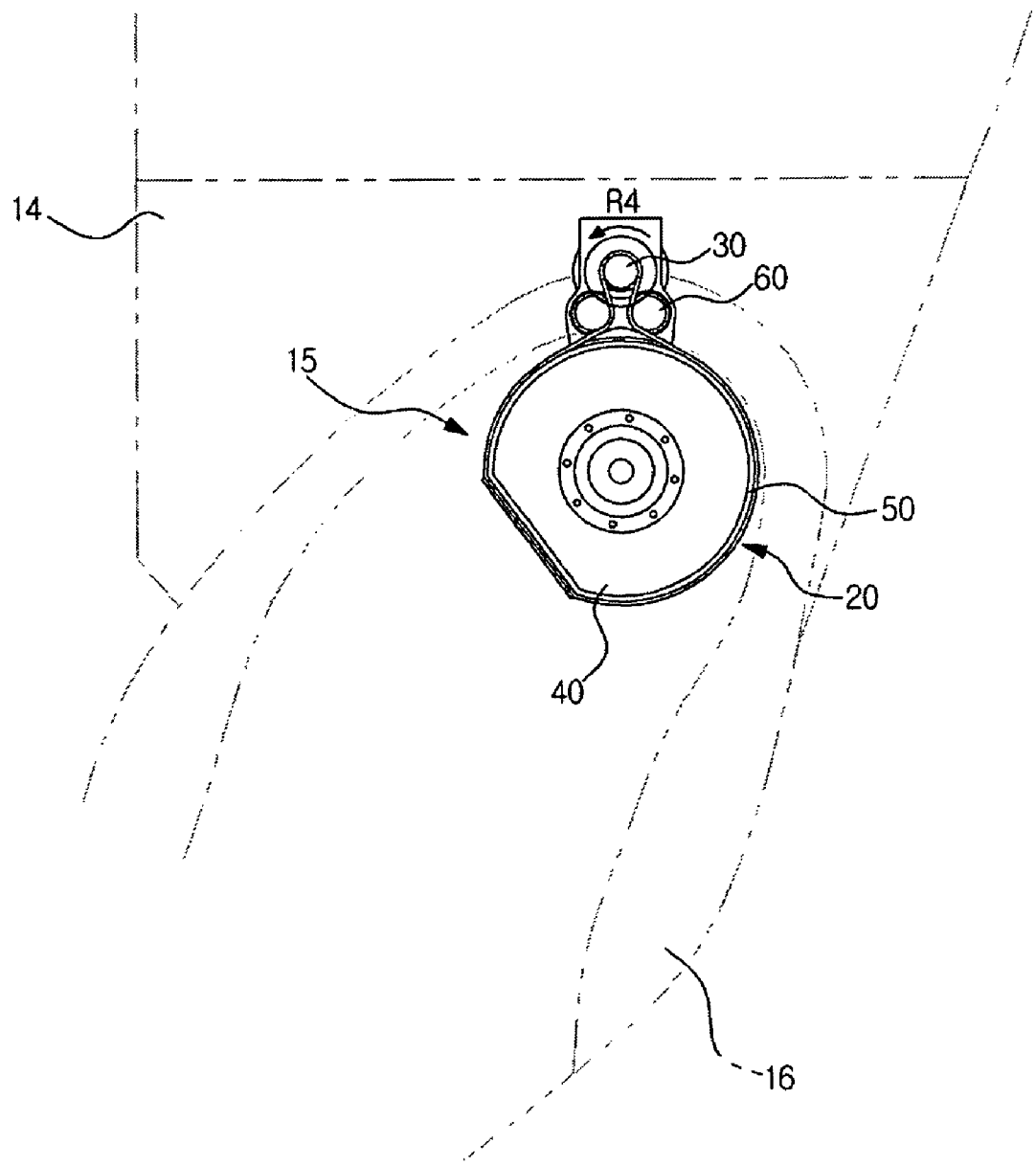

FIGS. 6 and 7 are views illustrating an operation of the driving apparatus of FIG. 1.

Here, on condition that the leg 16 has already moved forward by the operation of the driving apparatus 20, the operation of the driving apparatus 20 to move the leg 16 backward will be described.

As illustrated in FIG. 6, in order to move the leg 16, moved forward, backward, the driving unit 30 is rotated in a first direction (R1). When the driving unit 30 is rotated in the first direction (R1), a relative motion between the cable 50 and the driving unit 30 is performed. The pressure units 60 pressurize the cable 50, thus preventing the generation of slip of the cable 50 from the driving unit 30. When the cable 50 is moved by the driving unit 30, the pressure units 60 are rotated in a second direction (R2), and consequently, the driven unit 40 is rotated in a third direction (R3).

As illustrated in FIG. 7, the leg 16 is moved backward by the rotation of the driving unit 30, and then the driving unit 30 is rotated in a fourth direction (R4) in preparation for the next motion. In spite of the repeated rotation of the driving unit 30, the pressure units 60 pressurize the cable 50, and thus the cable 50 does not slip and smoothly transmits rotary force.

Figure 8:
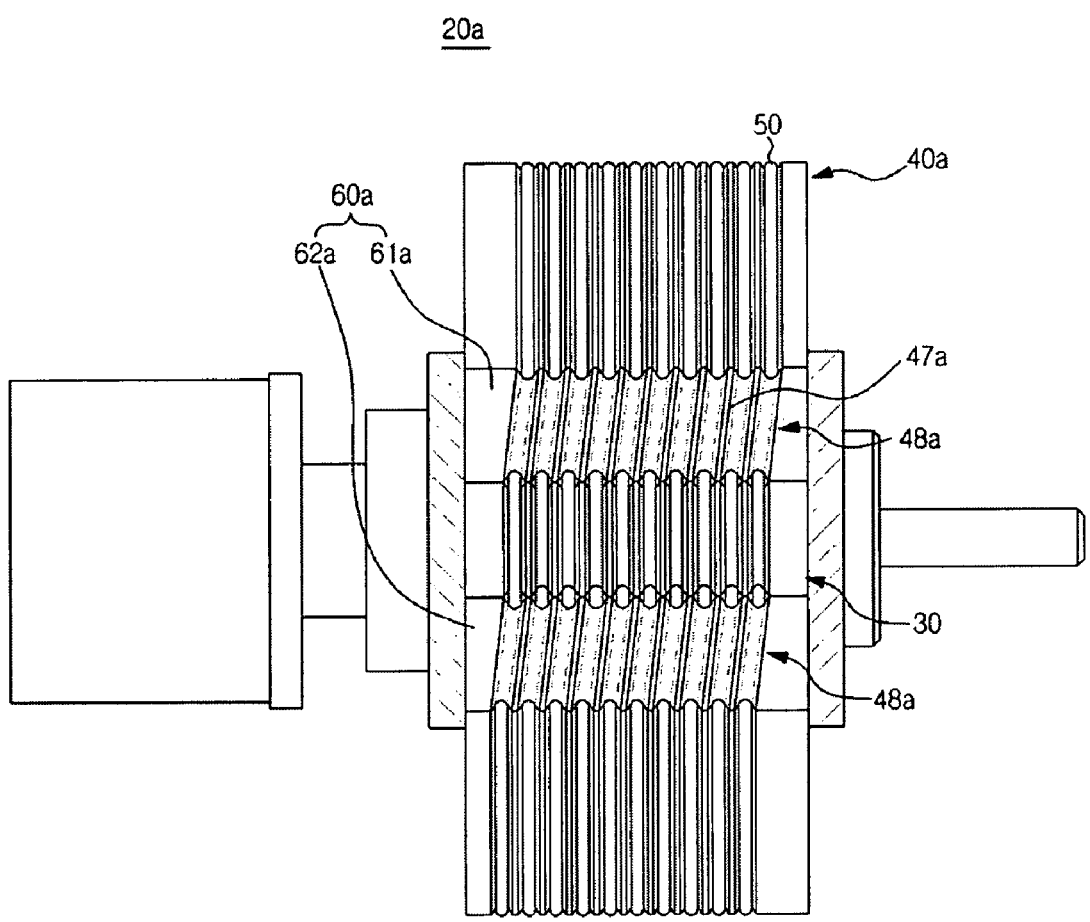
FIG. 8 is a plan view of a driving apparatus in accordance with an embodiment of the present general inventive concept.

FIG. 8 is a plan view of a driving apparatus in accordance with an embodiment of the present general inventive concept. Some portions in this embodiment, which are substantially the same as those in the embodiment illustrated in FIG. 1, are denoted by the same reference numerals even though they are depicted in different drawings, and some portions in this embodiment, which are modified from those in the embodiment illustrated in FIG. 1, are denoted by reference numerals obtained by adding a suffix 'a' to the reference numerals in the first embodiment.

In a driving apparatus 20a in accordance with the embodiment illustrated in FIG. 8, a shift portion 48a is provided not on driven unit 40a but on each of pressure units 60a.

The pressure units 60a in a pair are divided into first and second pressure units 61a and 62a, and the shift portions 48a are respectively provided on the first and second pressure units 61a and 62a. Inclined portions 47a, which move the strand of the cable 50 in parallel by as long as the half of the thickness of the cable 50, are provided on each of the shift portions 48a. The cable 50 is moved by as long as the half of the thickness of the cable 50 by the inclined portions 47a of the first pressure unit 61a, and is moved again by as long as the half of the thickness of the cable 50 by the inclined portions 47a of the second pressure unit 62a. Thus, when the cable 50 passes through the pressure units 60a in a pair, the cable 50 is moved in parallel by as long as the thickness of the cable 50.

As apparent from the above description, the present general inventive concept provides a driving apparatus and a robot having the same, in which a cable transmitting the rotary force of a driving unit to a driven unit has sufficient tensile strength and thus prevents a generation of slip of the cable from the driving unit or the driven unit to allow the rotary force to be transmitted to the driven unit without a loss.

Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A driving apparatus, comprising:
   a driving unit;
   a driven unit separated from the driving unit at a separation space so as not to contact the driving unit, and rotated by rotary force generated from the driving unit;
   a cable connecting the driving unit and the driven unit, and to transmit the rotary force to the driven unit;
   pressure units provided in the separation space, and to pressurize the cable in a direction of approaching opposite portions of the cable to each other to generate a tensile strength of the cable; and
   a groove-shaped guide provided on an outer circumferential surface of at least one of the driving unit, the driven unit, and the pressure units and corresponding to a diameter of the cable to guide a winding position of the cable, wherein the groove-shaped guide includes a shift portion to shift the winding position of the cable in parallel in an axial direction of the driving unit, the driven unit, or the pressure units.

2. The driving apparatus according to claim 1, wherein the pressure units are provided to pressurize the cable inwardly from outside of a loop formed by the cable.

3. The driving apparatus according to claim 1, wherein the groove-shaped guide includes:
   a parallel portion provided on the outer circumferential surface of at least one of the driven unit, the driving unit, and the pressure units to guide the winding position of the cable in a direction perpendicular to an axial direction of the driven unit, the driving unit, or the pressure units.

4. The driving apparatus according to claim 3, wherein:
   the driven unit has a cylindrical drum shape, and includes a level portion having a level outer circumferential surface; and the shift portion is provided on the level portion.

5. The driving apparatus according to claim 3, wherein:
the shift portion includes inclined portions inclined at a designated angle against the guide provided on the parallel portion; and
the inclined portions move the cable in parallel by as long as at least the diameter of the cable.

6. The driving apparatus according to claim 1, wherein:
the pressure units are prepared in a pair; and
the groove-shaped guide including the shift portion is respectively provided on the pressure units and the shift portion moves the winding position of the cable in parallel in the axial direction of the pressure units by as long as half of the diameter of the cable.

7. The driving apparatus according to claim 1, wherein each of the pressure units has a cylindrical roller shape.

8. A robot having at least one driving apparatus, the driving apparatus comprising:
a driving unit to generate a rotary force;
a driven unit separated from the driving unit at a separation space so as not to contact the driving unit, and rotated by rotary force generated from the driving unit;
a cable to transmit the rotary force to the driven unit;
a pair of pressure units provided in the separation space, and to pressurize the cable inwardly from outside of a loop formed by the cable to increase contact between the cable and at least one of the driving unit and the driven unit; and
a groove-shaped guide provided on an outer circumferential surface of at least one of the driving unit, the driven unit, and the pair of pressure units and corresponding to a diameter of the cable to guide a winding position of the cable, wherein the groove-shaped guide includes a shift portion to shift the winding position of the cable in parallel in an axial direction of the driving unit, the driven unit, or the pair of pressure units.

9. The robot according to claim 8, wherein the groove-shaped guide includes:
a parallel portion provided on the outer circumferential surface of at least one of the driven unit, the driving unit, and the pair of pressure units to guide the winding position of the cable in a direction perpendicular to the axial direction of the driven unit, the driving unit or the pair of pressure units.

10. A robot having at least one driving apparatus, the driving apparatus comprising:
a driving unit to generate a rotary force;
a driven unit separated from the driving unit at a separation space so as not to contact the driving unit, and rotated by rotary force generated from the driving unit;
a cable to transmit the rotary force to the driven unit;
a pair of pressure units provided in the separation space, and to pressurize the cable inwardly from outside of a loop formed by the cable to increase contact between the cable and at least one of the driving unit and the driven unit; and
a groove-shaped shift portion provided on an outer circumferential surface of the driven unit to move the winding position of the cable in parallel in an axial direction of the driven unit.

11. A robot having at least one driving apparatus, the driving apparatus comprising:
a driving unit to generate a rotary force;
a driven unit separated from the driving unit at a separation space so as not to contact the driving unit, and rotated by the rotary force generated from the driving unit;
a cable to transmit the rotary force to the driven unit;
a pair of pressure units provided in the separation space, and to pressurize the cable inwardly from outside of a loop formed by the cable to increase contact between the cable and at least one of the driving unit and the driven unit; and
groove-shaped shift portions respectively provided on outer circumferential surfaces of the pressure units to move a winding position of the cable in parallel in an axial direction of the pressure units.

12. A driving apparatus usable with a robot, the driving apparatus comprising:
a driven unit to drive the robot;
a driving unit to generate a force;
a cable to transmit the force from the driving unit to the driven unit;
one or more pressure units to pressurize the cable by increasing contact between the cable and at least one of the driving unit and the driven unit; and
a groove-shaped guide provided on an outer circumferential surface of the driven unit to receive and guide the cable, wherein the groove-shaped guide includes a shift portion to shift a winding position of the cable in an axial direction of the driven unit.

13. A driving apparatus, comprising:
a driving unit;
a driven unit rotated by a rotary force generated from the driving unit;
a cable connecting the driving unit and the driven unit, and to transmit the rotary force to the driven unit; and
a groove provided on an outer circumferential surface of the driven unit to receive the cable, and having a first shape groove formed in a first direction to guide the cable in the first direction and a second shape groove extended from the first shape groove in a second direction to guide the cable in the second direction.

14. The driving apparatus of claim 13, wherein the driving unit and the driven unit rotate with respect to a driving axis and a driven axis, respectively, parallel to each other, and the first direction is a circumferential direction of the driven axis.

15. The driving apparatus of claim 13, wherein the second direction has an angle with the first direction with respect to a driven axis of the driven unit.

16. The driving apparatus of claim 13, wherein:
the driving unit and the driven unit have a driving axis and a driven axis, respectively, parallel to each other;
the cable is connected between the driving unit and the driven unit in a direction; and
the direction is parallel to one of the driving axis and the driven axis with respect to a circumference direction of the outer circumferential surface of the driven unit.

17. The driving apparatus of claim 13, further comprising:
a pressure unit disposed between the driving unit and the driven unit to generate a force to push the cable toward a line connecting a driving axis of the driving unit and a driven axis of the driven unit,
wherein the cable includes a first cable portion winding around a portion of the driving unit, a second cable portion winding around a portion of the driven unit and disposed in the first shape groove and the second shape groove of the groove, and a third cable portion connected between the first cable portion and the second cable portion to receive the force from the pressure unit.

18. The driving apparatus of claim 13, further comprising:
a pressure unit disposed between the driving unit and the driven unit to generate a force to push the cable toward a line connecting axes of the driving unit and the driven unit, wherein the cable includes two portions disposed opposite to each other with respect to the line connecting rotating axes of the driving unit and the driven unit, and the two portions has a distance shorter than a diameter of at least one of the driving unit and the driven unit according to the force of the pressure unit.

* * * * *